United States Patent [19]

Zdenek et al.

[11] Patent Number: 5,539,818
[45] Date of Patent: Jul. 23, 1996

[54] TELEPHONIC CONSOLE WITH PRERECORDED VOICE MESSAGE AND METHOD

[75] Inventors: John M. Zdenek, Riverside; David A. Marcinkiewicz, Geneva; Andrew C. Capigatti, Winfield; Earl L. Smith, Downers Grove, all of Ill.

[73] Assignee: Rockwell Internaional Corporation, Seal Beach, Calif.

[21] Appl. No.: 926,891

[22] Filed: Aug. 7, 1992

[51] Int. Cl.⁶ .................................................. H04M 11/10
[52] U.S. Cl. .......................... 379/265; 379/67; 379/267; 379/88; 379/76
[58] Field of Search .................................. 379/67, 88, 89, 379/265, 73, 266, 267, 213, 165, 201, 77, 76; 395/2.28; 370/9, 110.1

[56] References Cited

U.S. PATENT DOCUMENTS

| | | | |
|---|---|---|---|
| 4,314,103 | 2/1982 | Wilson | 379/77 |
| 4,394,757 | 7/1983 | Muzumdar et al. | 379/93 |
| 4,625,081 | 11/1986 | Lotito et al. | 379/88 |
| 4,697,282 | 9/1987 | Winter et al. | 379/88 |
| 4,783,800 | 11/1988 | Levine | 379/67 |
| 4,849,966 | 7/1989 | Willis et al. | 379/88 |
| 4,891,835 | 1/1990 | Leung et al. | 379/88 |
| 4,918,322 | 4/1990 | Winter et al. | 379/88 |
| 5,081,672 | 1/1992 | Mita et al. | 379/88 |
| 5,121,422 | 6/1992 | Kudo | 379/77 |
| 5,127,004 | 6/1992 | Lenihan et al. | 379/213 |
| 5,127,044 | 6/1992 | Bonito et al. | 379/88 |
| 5,140,611 | 8/1992 | Jones et al. | 370/9 |
| 5,181,236 | 1/1993 | Lavallee et al. | 379/89 |
| 5,184,971 | 2/1993 | Williams | 379/88 |
| 5,189,692 | 2/1993 | Ferrara | 379/88 |
| 5,268,903 | 12/1993 | Jones et al. | 379/165 |
| 5,327,520 | 7/1994 | Chen | 395/2.28 |
| 5,371,785 | 12/1994 | Marcinkiewicz | 379/267 |
| 5,384,834 | 1/1995 | Sato et al. | 379/67 |
| 5,390,236 | 2/1995 | Klausner et al. | 379/77 |

*Primary Examiner*—Jeffery Hofsass
*Assistant Examiner*—Scott Wolinsky
*Attorney, Agent, or Firm*—C. B. Patti; G. A. Montayne

[57] ABSTRACT

A telephone console (10) for use in a telephonic call distribution system (12) for selectively interconnecting a plurality of telephonic units (16) of an external telephonic network (18) with a plurality of consoles (10) of the system, a prerecorded voice message system having a portable voice message storage unit (40) with a recorded voice message, a connector module (26) for releasable connection with the portable voice message unit (40) and a microprocessor (20) programmed to control the playing back of a recorded message to a console (10).

31 Claims, 5 Drawing Sheets

Fig. 5B 5,539,818

TELEPHONIC CONSOLE WITH PRERECORDED VOICE MESSAGE AND METHOD

BACKGROUND OF THE INVENTION

1. Field of the Invention

This invention generally relates to telephonic consoles used in automatic call distribution systems and, more particularly to such systems with message playback capability.

2. Description of the Prior Art

Telephonic consoles of the type having a keyboard, display and status indicators used by service agents in fielding calls in an automatic call distribution system are well known to facilitate the handling of numerous different types of calls from different callers from an external telephonic network. Such ACD systems are often used in responding to callers from a telemarketing, advertising or other campaign in which different types of callers are automatically identified by virtue of a dialed number identification service, or DNIS, in which DNIS numbers identifying the different types of calls are transmitted to the ACD system automatically by the external telephonic network.

Because of the hundreds or thousands of calls answered by an agent in a single work shift, it is also known to provide in conjunction with such ACD systems means for a service agent to record a preannouncement voice message in their own voice which is selectively played back to callers to reduce wear on the agent's voice and to reduce tedium. Such a preannouncement message is only a few seconds in length and generally includes an identifying greeting, such as, "Thank you for calling ABC Company. How may I help you?"

In modern ACD systems, however, it is desired for a single agent to answer many different types of calls which are identified by different DNIS numbers. DNIS numbers are used to distribute only one type of call to each agent. In such a system, a single message is adequate, but in modern systems each agent receives multiple types of calls requiring different types of greetings. Disadvantageously, known preannouncers are capable of recording and playing back only one type of message.

In addition, in known preannouncers, the recorded preannouncement can only be used at the console at which it was recorded, and the message is recorded in a volatile memory which cannot be removed from the console. Consequently, each time the power is shut off at the console, the preannouncement recording is lost, and each new agent at a console must rerecord the preannouncement message in his own voice at the beginning of each shift.

SUMMARY OF THE INVENTION

It is therefore the principal object of the present invention to provide a telephonic console with a prerecorded voice message system, or preannouncement system, and method which overcomes the inflexibility, inconvenience and other disadvantages of known preannouncers by virtue of use of a voice message storage unit which is portable and releasably connectable to the console to enable each agent to carry his voice preannouncements in his own voice from console to console as required and which contains a plurality of different messages for automatic playback in response to a variety of different trigger conditions corresponding to different types of calls.

This objective of the invention is achieved in part by providing, in a telephone console for use in a telephonic call distribution system for selectively interconnecting a plurality of telephonic units of an external telephonic network with a plurality of the telephonic consoles of the system, a prerecorded voice message system having a portable voice message storage unit with a recorded voice message, means for releasable interconnection of the portable voice message storage unit with the console, means for playback of the recorded message to one of the plurality of telephonic units connected through the external network when connected to the telephonic console and means responsive to releasable interconnection of the portable voice message storage unit with the console for control of the recorded message playback means to selectively play the recorded voice message.

Preferably, the portable voice storage unit includes a start code prior to the recorded voice message and the playback means includes means responsive to receipt of a trigger corresponding to the start code to start playback of the recorded voice message.

The object of the invention is also achieved through provision of such a telephonic console in which the start code corresponds to a dialed number identification service number generated automatically by the external network to identify a plurality of different categories of incoming calls to the call distribution system and in which the content of said plurality of different messages respectively corresponds to the plurality of different categories of incoming calls. Preferably, the portable voice storage unit has means for storing a plurality of different messages with a unique start code associated with each message.

Also, preferably, the control means includes means responsive to establishment of one trigger condition for one preannouncement message when another preannouncement message is in the process of being played back to terminate the playback of the other message to enable playback of the message associated with the one trigger condition.

Also, the object of the invention is achieved in part by providing in a telephonic call distribution system for selectively interconnecting a plurality of telephonic units of an external telephonic network with a plurality of internal units of the system, a method of employing prerecorded voice messages comprising the steps of (1) storing a voice message in a portable, nonvolatile, voice message storage memory unit, (2) releasably interconnecting the voice message storage unit to one of the consoles to enable the console to play back the permanent voice message stored therein when desired, (3) disconnecting the portable voice message storage unit from the console and (4) releasably interconnecting another voice message storage unit to the console with another stored voice message stored in lieu of the nonvolatile voice message storage unit to enable playback of the other stored voice message.

Preferably, the method includes the step of connecting the voice message storage unit to another console to enable playback of the stored voice message stored by the other console. Also, when the dialed number identification service member received at the console from the external network corresponds to the start code of a selected one of the plurality of messages, the message corresponding to the dialed number identification service number received is played back.

Preferably, so that even in the absence of a voice message storage unit being releasably connected to the console, the console still is capable of providing some preannouncement capability, a permanent voice message is also stored in an internal memory unit, and advantageously voice messages from both of the internal memory unit and the portable, nonvolatile, voice message storage unit are selectively played under a common control.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which.

DESCRIPTION OF THE PREFERRED EMBODIMENT

Figure 1:
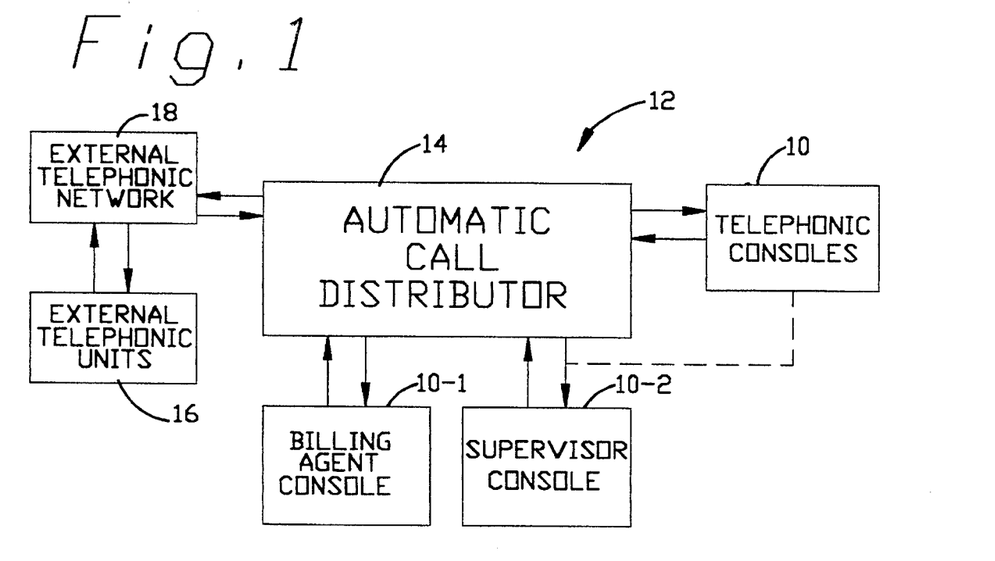
FIG. 1 is a functional block diagram of an automatic call distribution system, or ACD system, in which the telephonic consoles of the present invention are preferably employed.

Referring to FIG. 1, a plurality of the programmable telephonic consoles 10-1 through 10-N of the present invention, generally designated telephonic consoles, or consoles, herein, are seen as used in an automatic call distribution system 12. The system 12 has an automatic call distributor 14 which interconnects incoming calls from external telephonic units 16 of an external network 18 with at least some of the plurality of telephonic consoles 10-1, 10-2 and 10-N. The automatic call distributor, or ACD 14, includes a multiport, multiplexing telephonic switch, a central processing unit and an associated memory, not shown. The details of the ACD forms no part of the invention, but reference should be made to U.S. Pat. No. 5,268,903 of Jones et al. issued Dec. 7, 1993; to U.S. Pat. No. 5,140,611 issued Aug. 18, 1992 to Jones et al. and to U.S. Pat. No. 5,127,004 of Lenihan et al. issued Jun. 30, 1992, all commonly assigned to the assignee of the present invention, for an example of the type of ACD system in which the invention is preferably employed.

Figure 2:
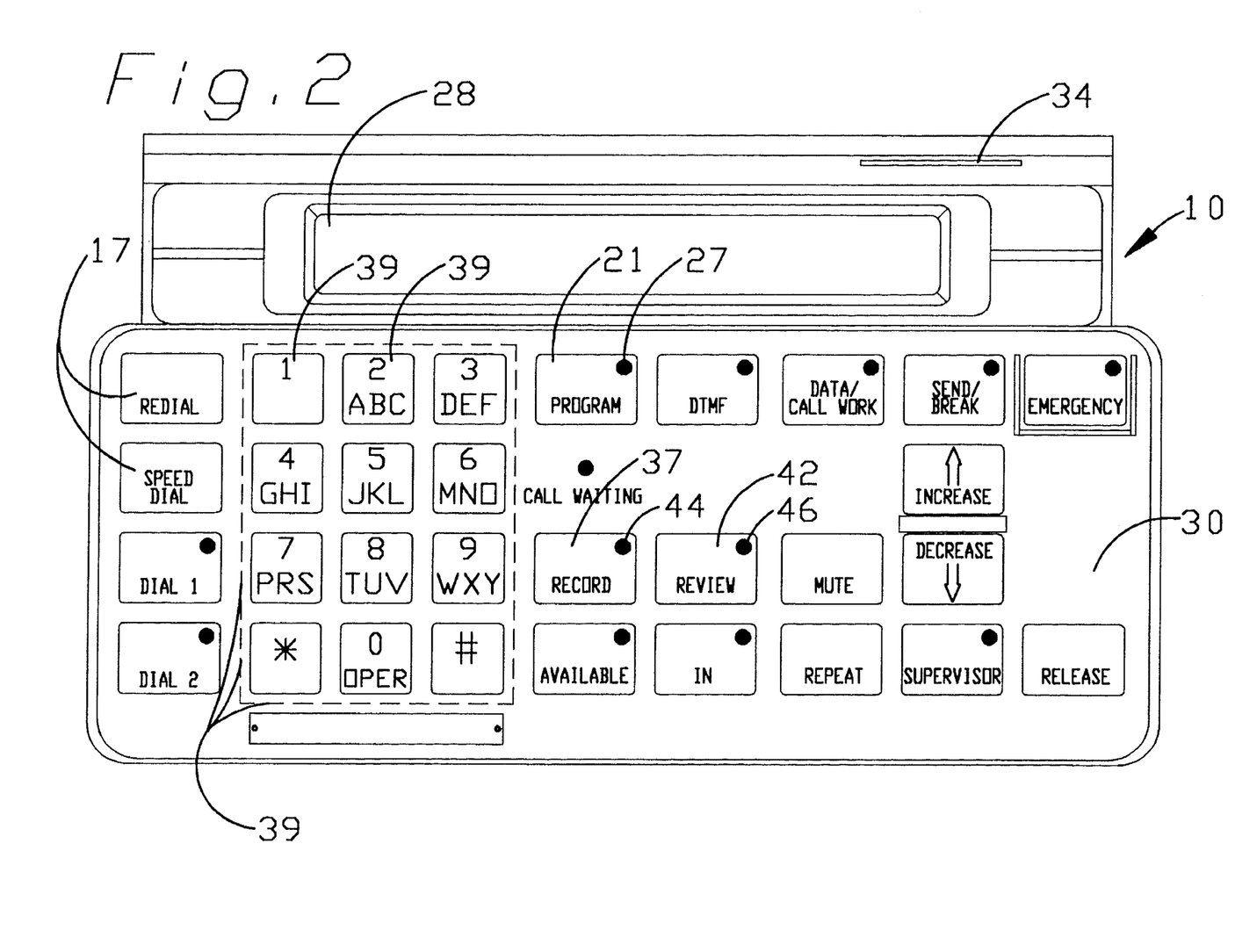
FIG. 2 is a plan view of a preferred embodiment of the telephonic console of the present invention.
Figure 3:
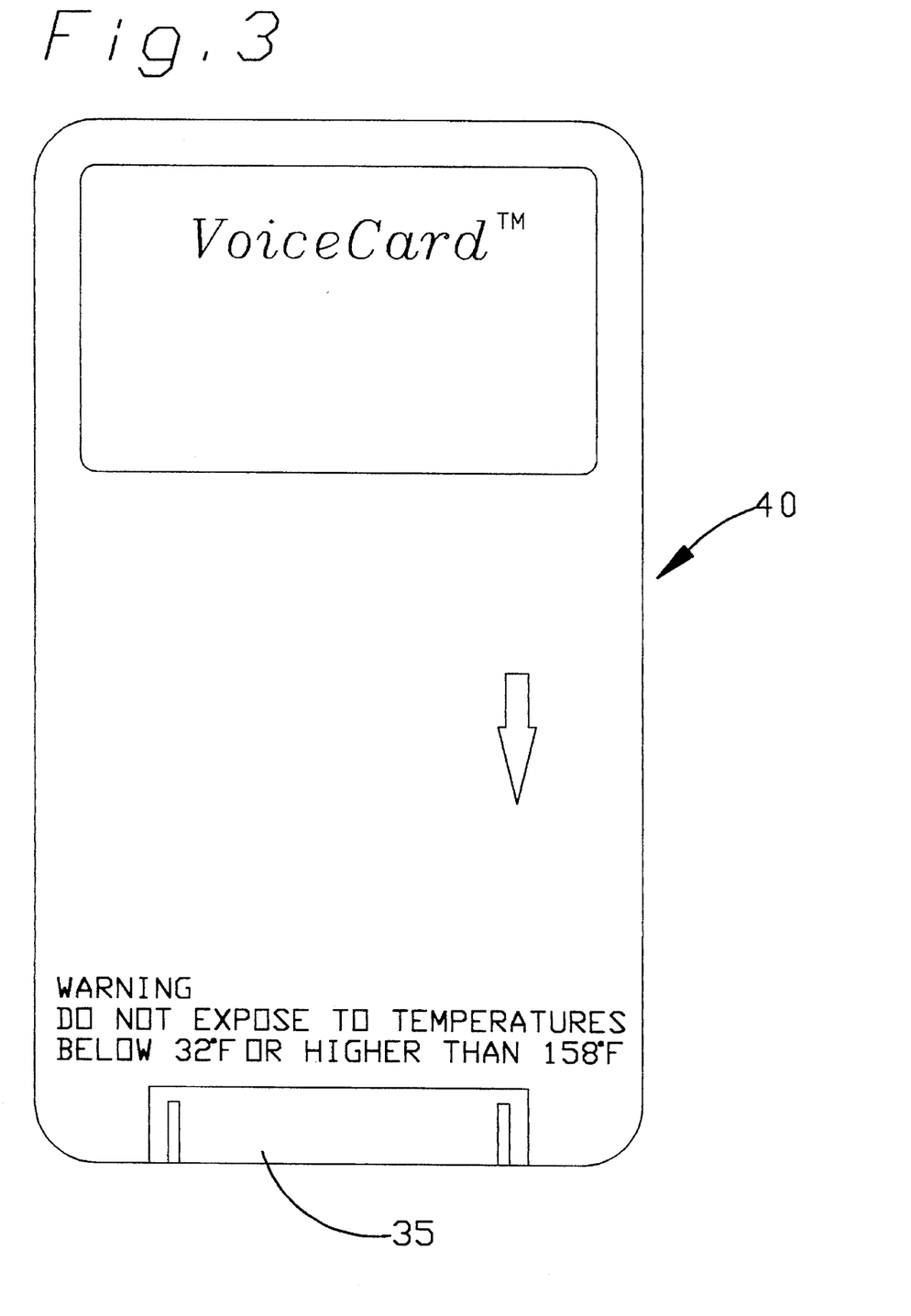
FIG. 3 is a side view of a portable voice message storage unit, or voice card, used in the preferred embodiment for carrying recorded voice messages, or preannouncements.

Referring now to FIG. 2, the preferred embodiment of the telephonic console is seen to include an alphanumeric LCD display 28, a keyboard 30, and a plurality of manually actuatable keys 17 with no indicators, a plurality of actuatable keys 21 with light indicators 27. In addition, the telephonic console 10 has a console slot 34, FIG. 2, of a voice card connector module 26, FIG. 4, for receipt and releasable connection of a removable Voice Card™, or portable voice storage unit, 40, FIG. 3. The card 40, FIG. 3, is preferably a nonvolatile 12 k memory, such as memory card model No. MF3128 produced by Mitsubishi Electronics. The card 40 has sixty input/output terminals or I/O terminals 35 at one edge of the card which is releasably connectable to a suitable card connector of a voice card via the console slot 34 of a voice card module 26, FIG. 4.

For further details covering other aspects of the telephonic console 10, reference should be made to the following applications filed contemporaneously herewith and assigned to the same assignee of the present invention: U.S. patent application Ser. No. 07/927,896 of Zdenek et al. filed Aug. 7, 1992 entitled "Telephonic Console With Programmable Nonvolatile Personality Memory and Method" and U.S. Pat. No. 5,371,785 issued Dec. 6, 1994 to David A Marcinkiewicz entitled "Telephonic Console With Multipersonality Control Apparatus and Method".

Figure 4:
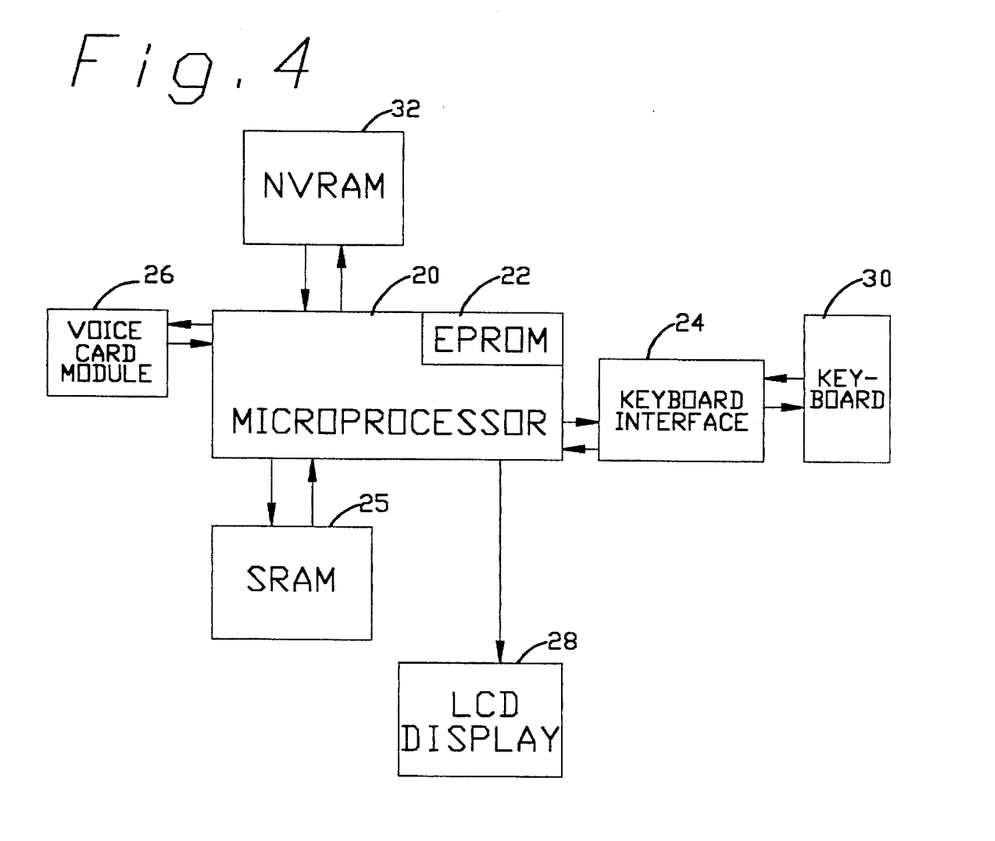
FIG. 4 is a functional block diagram of the telephonic console of FIGS. 1 and 2.

Referring now to FIG. 4, each of the telephonic consoles 10 includes a microprocessor 20, preferably an 80C32 model made by Intel, with its operating program stored in an associated erasable programmable read only memory, or EPROM 22, preferably a 32 k×8 UVEPROM made by Catalyst Co. having 32 k capacity. The preferred program is generally illustrated in the flow chart FIGS. 5A and 5B. The console 10 of the preferred embodiment also contains necessary logic circuitry for the microprocessor 20 to communicate with the keyboard interface circuit 24, and the keyboard 30, the display 28 and the indicators 27, FIG. 2.

The microprocessor 20 operates at a crystal clock frequency of 16,000 MHz to insure proper baud rate. Paged memory mapping is preferably used to address I/O, console programmed hardware (not shown), internal and external SRAM's and the voice card 40, if installed in the voice card module 26.

The LED keyboard interface contains thirteen LED's which are multiplexed using a single 8-bit latch. Preferably, the keyboard 30 is multiplexed using a 4-bit right left and an 8-bit relatch in the keyboard interface electronics 24, FIG. 4.

Preferably, the LCD display 28 has an eighty character display consisting of two lines, forty characters each. The display is preferably accessed by a single data write operation.

A nonvolatile random access memory, or NVRAM, 32 which is preferably a 1 kilobit (64/16) memory, such as NVRAM model 32K×8 Static RAM, or SRAM, is provided as a nonportable, nonvolatile internal voice storage unit for preannouncements in conjunction with voice card 40 or in the absence of voice card 40. The 32K×8 static random access memory or SRAM 25, FIG. 4, internally provides for four seconds of voice storage. In response to receipt of a DNIS number at the ACD system 12, FIG. 1, having a corresponding hex code of 0×51, the internal voice message stored in the SRAM 25 is played.

The console 10, FIG. 2, has provision for five separate (triggerable) preannouncement messages. A four second message, message one, is provided internally by NVRAM 32 while sixteen seconds of additional messages, messages two through five, provided by the plug-in voice card, or portable voice message storage unit 40.

Each of these preannouncement messages are played back to the customer in response to several different triggering methods and triggering conditions available in console firmware. Preferably, some of these triggers are programmable by the user, while several are not programmable. Proper playback, of course, assumes that at least one voice message is properly recorded on the voice card 40.

Four of these trigger selections for each preannouncement message are available for program by the user in the PROGRAM MODE as menu and parameter selections. These user defined triggers are described by the following trigger condition chart.

| | |
|---|---|
| OFF | USER Triggers turned off |
| IN/Agent LAMP | Playback when IN LED is off to steady on |
| Galaxy trigger 1 | Playback when hex code 0xc7 is received |
| Galaxy trigger 2 | Playback when hex code 0xc8 is received |

Multiple preannouncement triggers are also provided for each of the five messages, that are always available and completely transparent (not programmable) by the user or installer.

The multiple preannouncement messages stored in the portable voice message storage unit or voice card 40 are triggered by Dialed Identification Service Numbers or DNIS numbers. Various types of telephone calls, such as 1-800 or toll-free calls, received from customer units 14, FIG. 1, of the external telephonic network 18 are assigned a different DNIS number for each type of call. The long distance carrier companies such as American Telephone and Telegraph Co., MCI, Spirit, Northern Telecom, etc. of the external network assign DNIS numbers to different types of calls. The DNIS number and the incoming call from the external network 18 are carried concurrently to the automatic call distributor system 12. The DNIS number received has a corresponding hex code which when received by the console 10, triggers a corresponding voice card 40 or internal preannouncement message to be played.

These triggers consist of a unique receive B-Channel hex code for each of the five messages. Whenever one of these hex codes is received by the console, the corresponding message plays until completion. Again this assumes that the voice message is available internally in the SRAM 25, FIG. 4, or in the voice card 40, FIG. 3. The triggered message will playback even if one of the corresponding user triggers in PROGRAM MODE is selected, including "OFF".

These unique multiple preannouncement triggers are defined as follows:

| Hex | Function | Max Length |
|---|---|---|
| 0x51 | Trigger Internal message 1 | (4 seconds) |
| 0x52 | Trigger Voice Card message 2 | |
| 0x53 | Trigger Voice Card message 3 | (4 seconds) |
| 0x54 | Trigger Voice Card message 4 | (4 seconds) |
| 0x55 | Trigger Voice Card message 5 | (6 seconds) |

For voice card 40 recording and triggering, the Installer menu for the "VOICE CARD" must be programmed for "Recording is on". Also, the voice card 40 must be properly installed with the a "WRITE PROTECT" switch set to OFF.

Additionally, the console 10 selects only one of the recorded voice messages for playback when the trigger conditions are simultaneously established for a plurality of different recorded messages.

If plural user defined preannouncement messages are programmed for the same trigger selection, then when the console receives that trigger, the trigger assigned to the lowest message number is the only one that is played back.

If a preannouncement message playback section is in progress, a second incoming trigger of the same type causes that message to restart from the beginning. If a message playback session is in progress and a different type of valid trigger is received, then the first playback will prematurely terminate, and the new message will begin immediately.

If a command is made to trigger a preannouncement message that has never been recorded, i.e. is ERASED, the console firmware will throw away that command. The blank message will not be sent to the customer calling from the external network 18, FIG. 1. Once a preannouncement message has been properly recorded on the voice card it cannot be "ERASED" without removing the battery. If desired, a new message (including quiet) is recorded in place of the previously recorded message. To prevent playback of an unwanted or "quiet" message the user programmed trigger is set to "OFF" and the multiple preannouncement trigger is not sent. The internal preannouncer is "ERASED" by removing the power from the console.

While a triggered playback is in session, the agent and customer will both hear the voice message. The agent is unable to hear the customer until the message completes.

After the console is initialized by the KERNEL located in the EPROM 22 of the microprocessor 20, FIG. 4, control of the console functions is passed to the CON2EXEC. The CON2EXEC manages the user initiated keyboard features and the other automatic call distributor 14, FIG. 1, initiated features. The CON2EXEC receives requests via triggers and performs the following:

1. Respond to any triggers that are set.

2. Perform console maintenance functions (UPKEEP).

After the control of the console functions is passed to the CON2EXEC, the KYBDFEAT function routine also located in the EPROM 22, FIG. 4, is called whenever a user strikes a key 17, FIG. 2, on the console 10. The KYBDFEAT function manages the following functionality:

1. Respond to any user initiated keyboard strokes.

2. Selects keyboard feature based on keyboard strokes

3. When required, it updates the LCD keyboard stroke display and sends keyboard strokes to automatic call distributor.

When entered, KYBDFEAT key pad functions will examine KYBDTRIG for a set value. Based on the value of KYBDTRIG, the appropriate PREANN routine key pad function activity executes through completion. The following PREANN function keys are defined to perform the preannouncement feature.

When the console 10 is not actively handling a call, and a voice card 40, FIG. 3, is plugged in, the RECORD key 37, FIG. 2, on the keyboard 14 invokes the voice preannouncement message recording feature (PREANCE_REC). A numeric key 39 numbered one through five must be pressed to select and start the recording of the voice message. The available length of the messages are: message one (internal on SRAM 25, FIG. 4)—four seconds, message two—two seconds, message three–four seconds, message four—four seconds, message five–six seconds. While recording a preannouncement message, a subsequent depression of the RECORD key 37, FIG. 2, terminates the recording session.

When the console 10 is not actively handling a call, and the voice card 40, FIG. 3, is not plugged in or the card is write protected, the preannouncement recording feature is limited to the internal (numeric key pad one) four second voice preannouncement message in the SRAM 25, FIG. 4.

During a recording session, if the user enters the wrong key, the LCD 25, FIG. 4, will display on line 2, column 1, the message: "INVALID KEY ENTRY: RETRY".

The review key 42, FIG. 2, initiates the voice preannouncement message playback feature. A numeric key 39 (one through five) is pressed to select and start the playback of the voice message.

When the portable voice message storage unit 40, FIG. 3, is not plugged in, the Preannouncement review feature is limited to the internal (numeric key pad one) four second voice preannouncement message. While reviewing a preannouncement message, a subsequent actuation of the REVIEW key 42 prematurely terminates the playback session.

During a playback session, if the user enters the wrong key, the LCD 28 displays on line 2, column 1, the message "INVALID KEY ENTRY: RETRY".

Pressing the RECORD key 37, FIG. 2, invokes Basic Features' function RECORD which passes control to the subroutine PREANCE_REC. PREANCE_REC accepts subsequent numeric keys on the RECORD key 37.

If the key is a two through seven numeric key 39, it checks the CARDIN and the PROTECT flags to validate if the voice card 40, FIG. 4, is plugged in, and if it is able to receive message data. If the voice card 40, FIG. 3, is write protected or the card disable flag (VOICE_LOCK) is set, PREANCE_REC displays on the LCD 28, FIG. 2, the "voice card is locked." message (WRITE_PROTECT_MS).

After verification, processing is completed, the RECORD key 37 LED 44 is lit, the global variable voice_msg_number is updated with the selected message numeric key, and the preannouncement interrupt (PRE_INT) is enabled.

To terminate a preannouncement message recording session, PREANCE_REC routine reacts to a subsequent RECORD key 37, FIG. 2, entry by turning off the RECORD key LED 44 and disabling the preannouncement interrupt (PRE_INT).

Pressing the REVIEW key 42 invokes Basic Features' function REVIEW which passes control to PREANCE REV. PREANCE_REV accepts subsequent numeric keys 39 or the REVIEW key 42. If the key is a two through five numeric key 39, it checks the CARDIN flag to validate if the voice card 40, FIG. 3, is plugged in. After verification, the REVIEW key LED 46 is lit, the global variable voice_msg_number is updated with the selected message numeric key and the preannouncement interrupt (PRE_INT) is enabled.

To prematurely terminate a preannouncement message playback session, PREANCE_REV reacts to a subsequent REVIEW key 42 entry by turning off the REVIEW key LED 46 and disabling the preannouncement interrupt (PRE_INT).

Preannouncement message data is managed by the PREANN interrupt function PRE_INT. Based on which LED (RECORD or REVIEW) is lit and the value of the voice_msg_number, when enabled, PRE_INT will either start a recording session or a playback session. To determine the message number (one–five), PRE_INT uses the voice_msg_number. While recording is active, if the message reaches the end of the available time before the users presses, the record key 44 the message will be truncated. In the case of playback, if the message reaches the end of message (determined by recorded message size) before the user presses the REVIEW key 42, PRE_INT will shut off the REVIEW LED 46 and disable itself.

Also, PRE_INT is enabled by DECODE_B. When a user selected preannouncement playback trigger event is received from the automatic call distributor DECODE_B enables PRE_INT to perform a playback task via LED_REV flag and a message number.

Thus, it seen that a prerecorded message on the card is played back to the external telephonic unit 16 having a call connected with a console 10 having an installed voice card, in response to receipt of DNIS number one corresponding to one of the recorded voice messages in the card 40, FIG. 3, at the console 10. The associated software located in the EPROM 22, FIG. 4, of the microprocessor 20 controls the playback of the stored recorded messages when the voice message storage unit 40, FIG. 3, is releasably interconnected to the console 10. The microprocessor 20, FIG. 4, selectively controls the playing of each of the voice messages from the voice card 40, FIG. 3, based on receipt of a hex code associated with each message that corresponds to a DNIS number received by the ACD 14, FIG. 1, from the external telephonic network 18.

Thus, it is seen that the voice message system of the present invention has many unique advantages over the known system. Since the portable voice storage unit 40, FIG. 3, is releasably connected with the console 10, it is easily removed and interchangeable with other consoles of the ACD system 12. Additionally, the console has the capability of receiving other additional interchangeable portable voice storage units 40 inserted into the console 10 slot 34, FIG. 2, and play back the recorded messages on the other voice storage units 40.

Advantageously, the console 10, FIG. 2, has a record key 37 which is used for recording messages through the console on the portable voice message storage unit 40, FIG. 3. The recorded message on the voice card 40 is preferably a digitally encoded pulse modulated code. The start code which exists prior to the recorded voice message enables response to receipt of a trigger corresponding to the start code at the microprocessor 20, FIG. 4, so the console 10 plays back the recorded voice message associated with the code. The stop code after the recorded voice message enables detection of the stop code by the microprocessor 20 playback of the recorded voice messages is stopped.

Importantly, the unique start code preferably a hex card corresponds to a dialed number identification service number generated automatically by the external network 18, FIG. 1, to identify a plurality of different categories of incoming calls to the call distribution system 12. Thus, advantageously, the content of the plurality of different messages respectively corresponds to different categories of incoming calls having associated DNIS numbers.

The microprocessor 20, FIG. 4, along with its associated software in the EPROM 22 automatically establishes trigger conditions to selectively trigger the console 10 to playback one of the different messages recorded on the voice card 40, FIG. 3. Preselected trigger conditions are respectively selected for the playback of the recorded voice messages. If a DNIS trigger condition is established for one preannouncement message when another preannouncement message is being played back, the playback of the other message is terminated to enable the playing back of the message associated with the original trigger condition for provision of successive announcements. Advantageously, the establishment of a trigger condition for a blank message location on the voice card in which no message has been recorded provides for disabling the playing back of the blank message to eliminate callers having to listen to silence.

The console 10 includes a speaker to reproduce the voice of an incoming caller but the microprocessor preferably causes the speaker to be disabled from reproducing the voice of a caller automatically in response to playback of a recorded voice message to eliminate confusion.

The internal voice message storage unit with a recorded voice message in the SRAM 25, FIG. 4, enable use of the voice message system even if an agent forgets to bring their voice card. Multifunctionality is achieved since the single control functions to selectively cause playback of messages stored both in the voice card and the nonportable internal voice message storage unit 25.

Versatility is further enhanced since there are provided conditions for playback of the recorded messages which are both programmed from the keyboard and that are nonprogrammable at the keyboard are established in the console 10.

Thus, a method of employing prerecorded voice messages in a telephonic call distribution system 12 which selectively interconnects a plurality of telephonic consoles 10 to an external telephonic network 18 having a plurality of external telephonic units preferably, is shown having the basic steps of: (1) storing a voice message in a portable, nonvolatile, voice message storage unit 40, FIG. 3, (2) releasably interconnecting the voice message storage unit 40 to one of the consoles 10, FIG. 2, to enable the console to playback the permanent voice message stored therein when desired, (3) disconnecting the portable voice message storage unit from the console and (4) releasably interconnecting another voice message storage unit to the console 10 with another voice message stored there in lieu of the nonvolatile voice message unit 40 to enable playback of the other voice message. Typically, the voice message is recorded in the voice of one voice operator and the other voice message is recorded in the voice of another operator.

Continuing the method, the voice message storage unit 40, FIG. 3, is connected to another console to enable playback of the voice message which is stored in the voice card 40 by another console 10. A start code is stored in the voice message storage unit 40 prior to the beginning of the voice message, and a plurality of permanent voice messages are stored on the portable nonvolatile memory unit 40, each having a unique start code for each message. The console 10 receives a dialed number identification service or DNIS number from the external network 18 which corresponds to the start code of a selected one of the recorded messages, and the console 10 plays back the message which corresponds to the DNIS number received.

The method of employing prerecorded voice messages in the console includes the steps of storing a permanent voice message in an internal memory unit of SRAM 25, FIG. 4, and selectively playing a voice message from one of the internal memory unit 25 and the portable nonvolatile voice message storage unit 40, FIG. 3. Additionally the method of employing voice messages includes the step of storing a stop code in the memory unit or voice card 40, after the voice message is complete. In the preferred embodiment, the storing of the voice message includes the step of storing the voice message in pulse code modulated code.

Figure 5A:
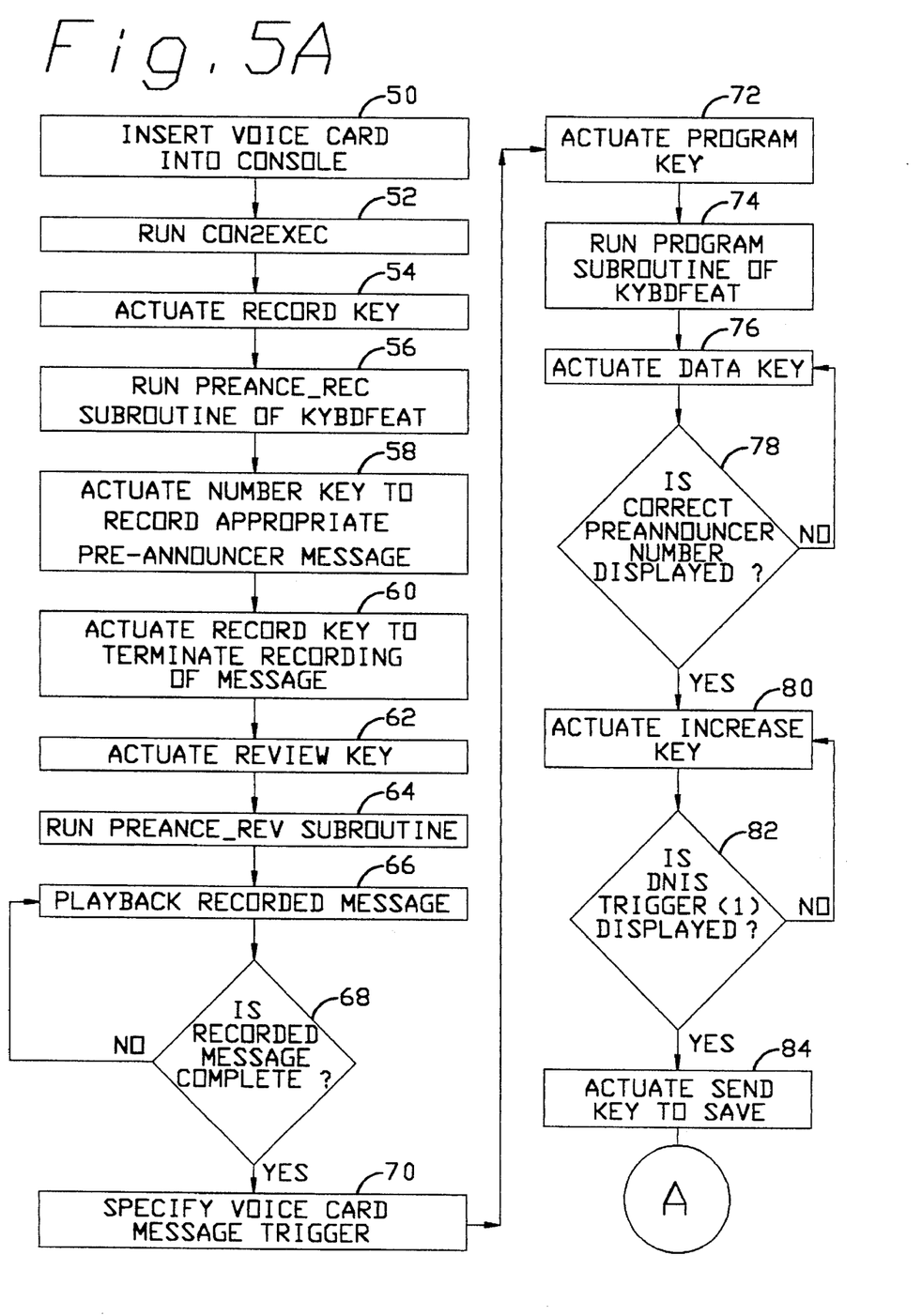
FIGS. 5A and 5B is a flow chart of the preferred embodiment of the software employed in conjunction with the microprocessor of FIG. 4 to control playback of the preannouncement messages stored on the voice storage unit of FIG. 3.
Figure 5B:
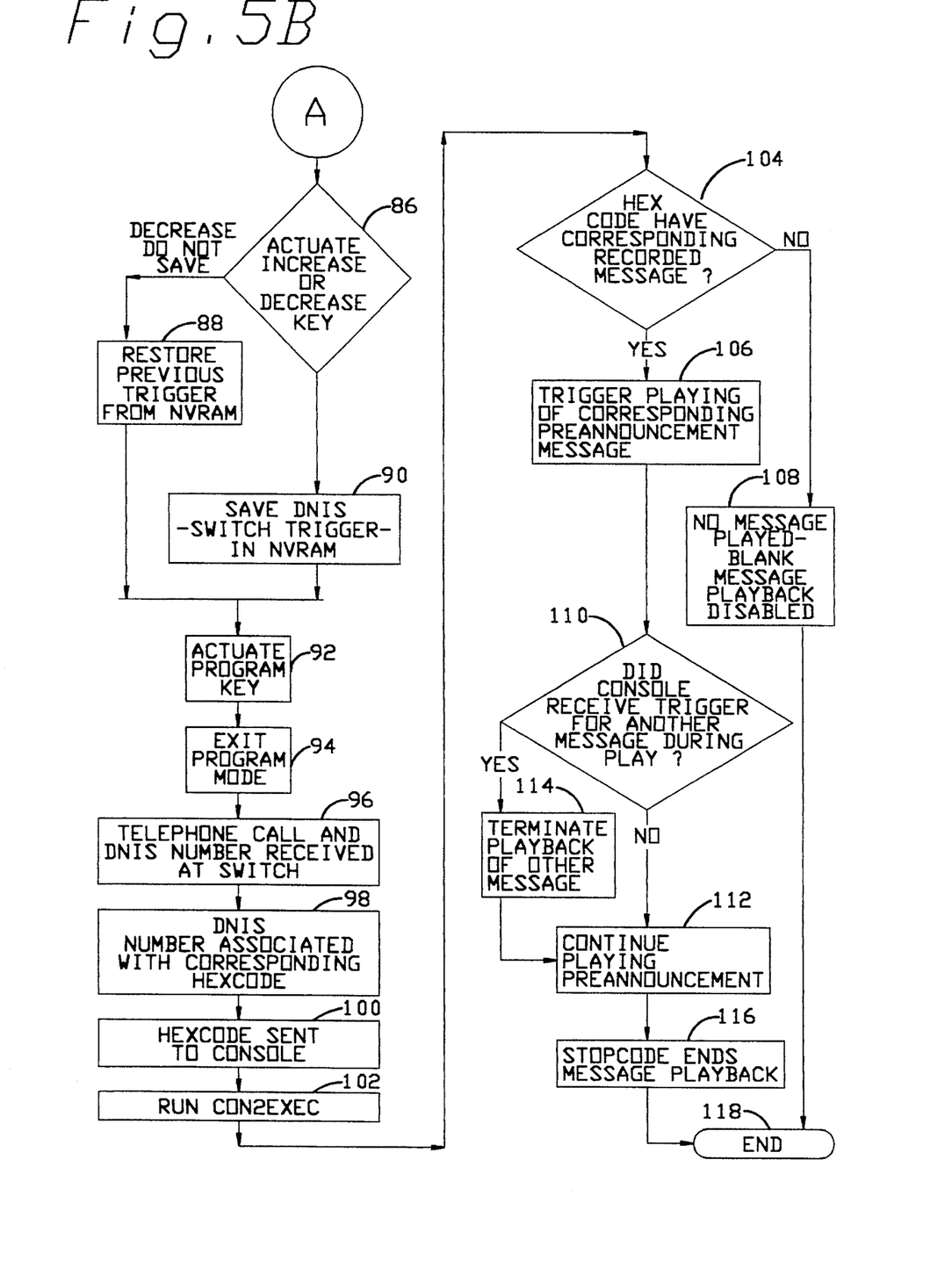

Referring to FIGS. 5A and 5B, a flow chart of the preferred embodiment of the software employed in conjunction with the microprocessor 20 of FIG. 4 to control playback of the preannouncement messages stored in the voice storage unit 40 of FIG. 3 is shown. In step 50, the voice card, or voice memory storage unit, 40 is inserted into the slot 34, FIG. 4, of the telephonic console 10. In step 52, the CON2EXEC routine stored in the EPROM 22 associated with the microprocessor 20, FIG. 4, is run. In step 54, the user begins recording of a voice message by actuating the Record key 37, FIG. 2 on the console 10. This initiates the running of the PREANCE_REC subroutine of the KYBDFEAT routine as seen in step 56. In step 58, a number key 39 is actuated to record the appropriate preannouncer voice message corresponding to the numbered selection displayed on the menu of the display 28 of the console 10, FIG. 2, in step 58, FIG. 5A. The operator or user speaks into the console to record the preannouncement voice message and then actuates the Record key 37, FIG. 2, to terminate the recording of the voice message as seen in step 60 of FIG. 5A.

In step 62, the user actuates the Review key 42, FIG. 2, to replay and review the previously recorded voice message. In step 64 the PREANCE_REV subroutine of KYBDFEAT is run in response to the actuation of the review key. The recorded message is played back at the console 10, FIG. 2, as seen in step 66, FIG. 5A. In step 68, the user determines if the recorded message is complete. If the recorded message is not complete the message is played back as seen in step 66.

If the recorded message is complete, a voice card message trigger is specified to correspond with the recorded message in step 70. In step 72, the user actuates the Program key 21, FIG. 2, of the console 10. This initiates the running of the PROGRAM subroutine of KYBDFEAT in step 74, FIG. 5A. The user actuates the Data key 47, FIG. 2, to display the associated preannouncer number with the recorded voice message in step 76, FIG. 5A. The user determines if the preannouncer number displayed at the LCD display 28, FIG. 2, is correct in step 78, FIG. 5A. If an incorrect preannouncer number is displayed the user returns to step 76 to actuate the Data key 47, FIG. 2. If the correct preannouncer number is displayed in step 80, FIG. 5A, the Increase key 48, FIG. 2, is actuated. In step 82, FIG. 5A, the user determines if the Dialed Number Identification Service (DNIS) trigger is displayed. If the DNIS trigger is not displayed then the Increase key 48, FIG. 2, is again actuated in step 80. If the correct DNIS trigger is displayed then the Send key 49, FIG. 2, is actuated in step 84, FIG. 5A, to initiate saving in the NVRAM 32, FIG. 4, the appropriate DNIS trigger with its associated stored voice message.

In step 86, FIG. 5B, the Increase key 48, FIG. 2, or the Decrease key 43 is actuated to determine saving the DNIS trigger. If the Decrease key 48 is actuated, the DNIS switch trigger is not saved and the previous trigger from the NVRAM 32, FIG. 4, is restored in step 88. If the Increase key 48, FIG. 2, is actuated the DNIS switch trigger is saved in the NVRAM 32, FIG. 4, as seen in step 90, FIG. 5B. In step 92, the Program key 21, FIG. 2, is actuated to exit the program mode of the console as seen in step 94, FIG. 5B.

Once the voice messages have been recorded, reviewed and stored with the appropriate corresponding DNIS trigger selection the console is prepared to playback a responsive voice message upon receipt of an external call. In step 96, a telephonic call from an external telephonic unit 16, FIG. 1, and a DNIS number is received from the external telephonic network 18 at the multiport switch of the automatic call distributor 14. In step 98, the DNIS number is associated with the hex code corresponding to the particular received call at the call distributor 14, FIG. 1. In step 100, FIG. 5B, the hex code is sent to the console. The CON2EXEC routine is run upon receipt of the hex code in step 102. In step 104, the microprocessor 20, FIG. 4, in conjunction with the associated software stored in the EPROM 22 determines if the hex code has a corresponding recorded message. If there is no corresponding voice message then no voice message is played and the playback of a blank message at the console 10 and to the connected external telephonic unit 16, FIG. 1, is disabled as seen in step 108.

If the received hex code does have a corresponding recorded message then in step 106, FIG. 5B, the microprocessor 20, FIG. 4, triggers the playback of the corresponding permanently stored voice message. The voice message played back is in the voice of the operator who recorded the message on the voice message storage memory unit 40, FIG.

3. In step 110, FIG. 5B, the microprocessor determines if another trigger or hex code for another voice message is received from the call distributor 14 during the playing of the initiated voice message. If a trigger corresponding to another message is received at the console 10, FIG. 1, then the playback of the other message is terminated as seen in step 114. If the console 10 did not receive another trigger during the playback of the voice message, then in step 112, FIG. 5B, the preannouncement voice message is continued to be played at the console 10 and the connected external telephonic unit 16. In step 116, the stop code ends the playback of the stored voice message and the voice message ends in step 118.

Subsequent prerecorded voice messages are played back in response to additional telephonic calls with DNIS numbers being received at the switch of the automatic call distributor 14, FIG. 1. Additionally, different voice messages recorded on another voice message storage unit in the voice of another operator are played at the console 10 and an external telephonic unit by disconnecting the portable voice message storage unit 40 from the console and releasably interconnecting the other voice message storage unit to the console with the other stored message to enable the playback of the other voice message.

While a detailed description of the preferred embodiment of the invention has been given, it should be appreciated that many variations can be made thereto without departing from the scope of the invention as set forth in the appended claims.

We claim:

1. A telephonic console for use in a telephonic call distribution system for selectively interconnecting a plurality of telephonic units of an external telephonic network with the telephonic console and a plurality of other telephonic consoles of the system, the improvement being a prerecorded voice message system, comprising:

a portable, nonvolatile, voice message storage unit with a plurality of different recorded voice messages;

means for releasable interconnection of the portable voice message storage unit with the telephonic console;

means for automatic playback of one of the recorded messages to one of the plurality of telephonic units connected through the external network when a telephonic call from one of the telephonic units is connected to the telephonic console; and means at the telephonic console for controlling the recorded message playback means to selectively and automatically play one of the recorded voice messages of the portable voice message storage unit after the portable voice message storage unit has been connected to the telephonic console.

2. The telephonic console of claim 1 in which said portable voice message storage unit includes a nonvolatile memory with I/O terminals, and means for mating connection of the I/O terminals with the releasable interconnection means.

3. The telephonic console of claim 1 in which said portable voice storage unit includes a unique start code prior to are beginning of each of the recorded voice messages, and said playback means includes means responsive to receipt of a trigger corresponding to a start code to automatically start playback of an associated recorded voice message.

4. The telephonic console of claim 1 in which said portable voice storage unit includes a stop code after each of the recorded voice messages, and said playback means includes means for detecting a stop code to stop playback of an associated recorded voice message.

5. The telephonic console of claim 1 including a speaker to reproduce the voice of an incoming caller, and means for automatically disabling the speaker from reproducing the voice of a caller in response to playback of a recorded voice message.

6. The telephonic console of claim 1 including a fixed internal voice message storage unit permanently housed within the console and having a recorded voice message, and in which said controlling means includes means for selectively causing playback of messages stored both in the portable voice message unit and the fixed internal voice message storage unit.

7. The telephonic console of claim 1 including at least one additional portable voice storage unit interchangeable with the voice storage unit for releasable interconnection with the console.

8. The telephonic console of claim 7 including means at the console for recording the recorded message on the portable voice message storage unit.

9. The telephonic console of claim 1 in which said recorded messages are recorded in code.

10. The telephonic console of claim 9 in which said recorded messages are digitally encoded.

11. The telephonic console of claim 9 in which the digital code is pulse code modulated code.

12. The telephonic console of claim 1 in which said portable voice storage unit has means for storing a plurality of different messages with a unique start code associated with each message.

13. The telephonic console of claim 12 in which each start code corresponds to dialed number identification service data generated automatically by the external network to identify a plurality of different types of incoming calls to the call distribution system, and the content of each of said plurality of different messages respectively correspond to each of the plurality of different types of incoming calls.

14. The telephonic console of claim 12 in which said start code is a hex code.

15. The telephonic console of claim 1 including means for establishing trigger conditions to selectively trigger the message playback means upon receipt of the telephonic call at the console to automatically playback a selected one of a plurality of different messages recorded on said portable voice message storage unit.

16. The telephonic console of claim 15 including means for selectively respectively establishing a plurality of preselected trigger conditions for playback of the plurality of recorded voice messages.

17. The telephonic console of claim 16 including means for selecting only one of a plurality of recorded voice messages for playback when more than one of the trigger conditions at the console are simultaneously established for a plurality of different recorded voice messages.

18. The telephonic console of claim 16 in which said controlling means includes means responsive to the establishment of a trigger condition for a message already in process of being played back to stop playing of the message and begin playback of the message at its beginning.

19. The telephonic console of claim 16 in which said controlling means includes means responsive to establishment of one trigger condition for one message when another message is being played back to terminate the playback of the other message to enable playback of the one message associated with the one trigger condition.

20. The telephonic console of claim 16 in which said controlling means includes means responsive to establishment of a trigger condition respectively associated with a blank message location in the memory of the message storage unit in which no message has been recorded to disable the playback means from playing back the blank message.

21. The telephonic console of claim 1 in which the console has a keyboard, and said controlling means includes means for programming certain triggering conditions for playback of the recorded message from the keyboard.

22. The telephonic console of claim 21 including means for establishing other triggering conditions for playback of the recorded messages that are not able to be programmably established at the keyboard.

23. In a telephonic call distribution system for selectively interconnecting a plurality of units of an external telephonic network with a telephonic console internally connected at the system, a method of storing and playing prerecorded voice messages comprising the steps of:

storing a first plurality of voice messages in a portable, nonvolatile, first voice message storage memory unit;

connecting the first voice message storage unit to the telephonic console to enable the console to automatically select and playback one of the first plurality of voice messages therein upon receipt of a telephonic call at the console;

disconnecting the portable first voice message storage unit from the console; and connecting a second voice message storage unit to the console with a second plurality of voice messages stored within the second voice message storage unit in lieu of the nonvolatile first voice message storage unit to enable automatic selection and playback of one of the second plurality of voice messages.

24. The method of claim 23 in which said first voice messages are recorded in a voice of one operator and said second voice messages are recorded in another voice of another operator.

25. The method of claim 23 including the step of connecting the first voice message storage memory unit to another console to enable automatic playback of the first voice messages stored therein by the other console.

26. The method of claim 23 in which the step of storing includes the step of storing a stop code in the first voice message storage memory unit after the recording of each first voice message is completed.

27. The method of claim 23 in which said step of storing the first voice message includes the step of storing the first voice messages in a pulse code modulated signal.

28. The method of claim 23 in which the step of storing includes the step of storing in the first voice message storage unit a unique start code prior to the beginning of each of the first voice messages.

29. The method of claim 28 in which the step of storing the first voice messages includes the step of assigning a unique start code for each message.

30. The method of claim 29 including the step of receiving at the console dialed number identification service data from the external network corresponding to the start code of a selected one of a plurality of messages, and playing back the message corresponding to the dialed number identification service data received.

31. The method of claim 29 including the steps of permanently storing an internal voice message in an internally fixed memory unit of the console, and selectively playing voice messages from one of the internally fixed memory unit and the portable, nonvolatile, first voice message storage memory unit upon receipt of a telephonic call at the console.

* * * * *